United States Patent
Lin

(10) Patent No.: US 10,497,341 B2
(45) Date of Patent: *Dec. 3, 2019

(54) SCREEN DISPLAY METHOD, APPARATUS AND MOBILE TERMINAL

(71) Applicant: GUANGDONG OPPO MOBILE TELECOMMUNICATIONS CORP., LTD., Dongguan, Guangdong (CN)

(72) Inventor: Yugui Lin, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/240,921

(22) Filed: Jan. 7, 2019

(65) Prior Publication Data

US 2019/0138075 A1 May 9, 2019

Related U.S. Application Data

(63) Continuation of application No. 16/099,659, filed as application No. PCT/CN2017/092094 on Jul. 6, 2017.

(30) Foreign Application Priority Data

Jul. 8, 2016 (CN) .......................... 2016 1 0542803

(51) Int. Cl.
*G06F 1/3203* (2019.01)
*G06F 3/0481* (2013.01)
(Continued)

(52) U.S. Cl.
CPC ............... *G09G 5/38* (2013.01); *G06F 1/163* (2013.01); *G06F 1/1652* (2013.01);
(Continued)

(58) Field of Classification Search
CPC ..... G06F 1/3203; G06F 3/0481; G06F 3/0484
See application file for complete search history.

(56) References Cited

U.S. PATENT DOCUMENTS

| 2007/0120959 A1* | 5/2007 | Wu ..................... G01R 31/3648 |
| | | 348/14.02 |
| 2010/0064534 A1* | 3/2010 | Schumacher ........ G01C 15/004 |
| | | 33/228 |

(Continued)

FOREIGN PATENT DOCUMENTS

| CN | 103399694 | 11/2013 |
| CN | 104298351 | 1/2015 |

(Continued)

OTHER PUBLICATIONS

SIPO, First Office Action for CN Application No. 201610542803, dated Jul. 25, 2017.
(Continued)

*Primary Examiner* — Sing-Wai Wu
(74) *Attorney, Agent, or Firm* — Hodgson Russ LLP

(57) ABSTRACT

A screen display method and apparatus and a mobile terminal are provided. The method includes: acquiring target offset position information of the display screen of the mobile terminal deviating from a preset reference position; searching for target display region information corresponding to the target offset position information from a preset database, the preset database comprising at least one set of offset position information and display region information corresponding to each set of the offset position information; and displaying content to be displayed by the mobile terminal in a display region indicated by the target display region information.

13 Claims, 4 Drawing Sheets

(51) Int. Cl.
  *G06F 3/0484* (2013.01)
  *G09G 5/38* (2006.01)
  *G06F 3/01* (2006.01)
  *G06F 1/16* (2006.01)
  *G06F 1/3234* (2019.01)
  *G06T 7/50* (2017.01)

(52) U.S. Cl.
  CPC .......... *G06F 1/3203* (2013.01); *G06F 1/3265* (2013.01); *G06F 3/01* (2013.01); *G06F 3/013* (2013.01); *G06F 3/0481* (2013.01); *G06F 3/0484* (2013.01); *G06F 1/1637* (2013.01); *G06F 2200/1614* (2013.01); *G06T 7/50* (2017.01); *G06T 2207/10048* (2013.01); *G06T 2207/30201* (2013.01); *G09G 2340/0492* (2013.01); *G09G 2354/00* (2013.01); *G09G 2380/02* (2013.01)

(56) References Cited

U.S. PATENT DOCUMENTS

2013/0235008 A1  9/2013  Kwon
2015/0264799 A1  9/2015  Kurata et al.
2016/0154458 A1  6/2016  Liu et al.
2018/0173483 A1*  6/2018  Wang .................. G06F 3/01

FOREIGN PATENT DOCUMENTS

| CN | 104461289 | 3/2015 |
| CN | 104635755 | 5/2015 |
| CN | 104850317 | 8/2015 |
| CN | 204965020 | 1/2016 |
| CN | 105389011 | 3/2016 |
| CN | 105573485 | 5/2016 |
| CN | 106200965 | 12/2016 |
| EP | 2357548 | 8/2011 |

OTHER PUBLICATIONS

WIPO, ISR for PCT/CN2017/092094, Oct. 12, 2017.
SIPO, Notification to Grant Patent Right for Invention, dated Oct. 18, 2017.
EPO, Office Action for EP Application No. 17823670, dated Apr. 29, 2019.
USPTO, Office Action for U.S. Appl. No. 16/099,659, dated Sep. 6, 2019.

* cited by examiner

SCREEN DISPLAY METHOD, APPARATUS AND MOBILE TERMINAL

CROSS-REFERENCE TO RELATED APPLICATIONS

The present application is a continuation application of a U.S. application Ser. No. 16/099,659, filed on Nov. 7, 2018, which is a national phase entry of International Application No. PCT/CN2017/092094, filed on Jul. 6, 2017, which claims priority from Chinese Patent Application No. 201610542803.9, filed on Jul. 8, 2016 by GUANGDONG OPPO MOBILE TELECOMMUNICATIONS CORP., LTD., entitled "SCREEN DISPLAY METHOD, DEVICE AND MOBILE TERMINAL". The entire contents of the aforementioned applications are incorporated by reference herein.

TECHNICAL FIELD

The present disclosure relates to a field of electronic technology, and in particular, to a screen display method and apparatus, and a mobile terminal.

BACKGROUND

At present, with the continuous development of terminal technology, an increasing number of functions may be implemented on the terminal, and there are more and more design forms of the terminal. For example, portable wearable devices bring convenience to the user to carry the terminal. A wearable device such as a wristband may be configured with a display screen through which the user may view information such as time, text messages and the like. However, since the wristband is able to be rotated, when the display screen of the wristband is out of sight, the user needs to take a manual adjustment to rotate the wristband display in the sight to view the content on the display, which brings the user great inconvenience when using the terminal. Moreover, when information is displayed on the screen of the wristband, the wristband always displays information via the entire display screen, even if the display screen is not within the user's sight, which leads to a large power consumption of the terminal.

SUMMARY

Embodiments of the present disclosure disclose a screen display method and apparatus and a mobile terminal.

Embodiments of the present disclosure disclose a screen display method, which is applied to a mobile terminal, in which the mobile terminal is configured with a display screen, and the display screen is provided with at least one display region. The method may include: acquiring target offset position information of the display screen of the mobile terminal deviating from a preset reference position; searching for the target display region information corresponding to the target offset position information from a preset database, the database including at least one set of offset position information and display region information corresponding to each set of the offset position information; displaying content to be displayed by the mobile terminal in a display region indicated by the target display region information.

Embodiments of the present disclosure also provide a screen display apparatus, which is provided in a mobile terminal, in which the mobile terminal is configured with a display screen, the display screen is provided with at least one display region, and the apparatus includes one or more processors; a memory storing instructions executable by the one or more processors; the one or more processors being configured to: acquire target offset position information of the display screen of the mobile terminal deviating from a preset reference position; search for the target display region information corresponding to the target offset position information from a preset database, the database including at least one set of offset position information and display region information corresponding to each set of the offset position information; display content to be displayed by the mobile terminal in a display region indicated by the target display region information.

Embodiments of the present disclosure also disclose a mobile terminal, including a body and an endless belt; in which the body is provided with a flexible display screen, the endless belt is configured to connect two ends of the body; and the body is also provided with a level sensor, the level sensor is configured to measure a target angle value of the flexible display screen deviating from a preset reference position to display content to be displayed by the mobile terminal in a display region corresponding to the target angle value.

BRIEF DESCRIPTION OF THE DRAWINGS

In order to make technical solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present disclosure are hereinafter described clearly and completely with reference to accompanying drawings in embodiments of the present disclosure. Apparently, embodiments described are a part of embodiments of the present disclosure, but not all embodiments. All other embodiments obtained by those skilled in the art based on the embodiments from the present disclosure without creative labor shall fall in the protection scope of the present disclosure.

The term "embodiments" described herein means that specific features, structures, or characteristics described in connection with embodiments may be included in at least one embodiment of the disclosure. The appearances of the term in various places in the specification are not necessarily referring to the same embodiments, and are not exclusive or alternative embodiments that are mutually exclusive. Those skilled in the art will explicitly and implicitly understand that the embodiments described herein may be combined with other embodiments.

It should be understood that the mobile terminal involved in embodiments of the present disclosure may include but is not limited to terminals configured with a display screen including a mobile phone (such as an Android mobile phone, an iOS mobile phone, etc.), a tablet computer, a mobile Internet device (MID for short), and a personal digital assistant (PDA for short), a wearable device and the like. The configured display screen may be a bendable flexible display screen in particular. The mobile terminal may also be referred to as a user equipment (UE for short), a terminal, a wireless terminal, or a mobile station (MS for short), which will not be limited in embodiments of the present disclosure.

Embodiments of the disclosure disclose a screen display method and apparatus and a mobile terminal, which is able to automatically adjust the display region according to the offset position information of the terminal display screen, thereby reducing the power consumption of the terminal. The details are as follows.

Figure 1:
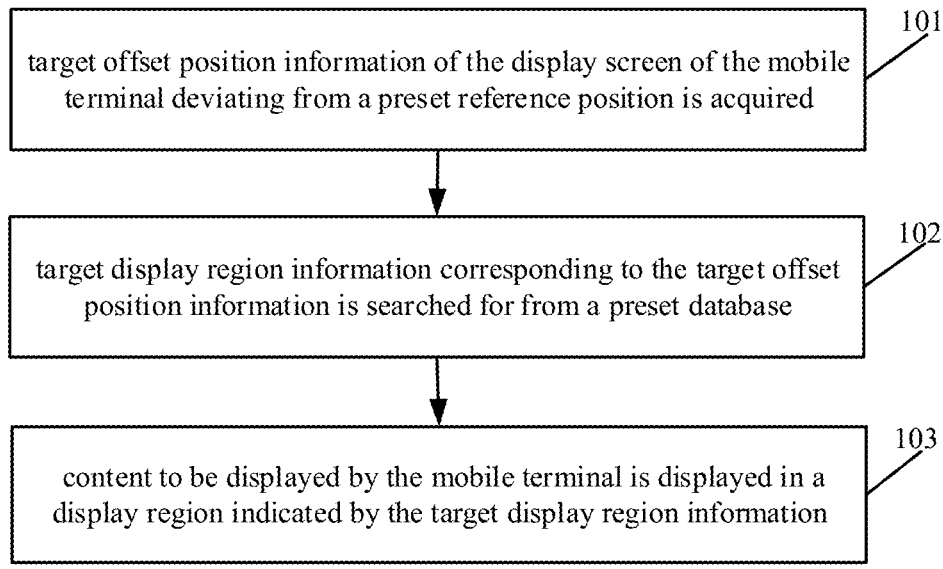
FIG. 1 is a schematic flow chart of a screen display method disclosed in an embodiment of the present disclosure.

Referring to FIG. 1, FIG. 1 is a schematic flow chart of a screen display method disclosed in an embodiment of the present disclosure. Specifically, the method in an embodiment of the present disclosure may be specifically applied to the foregoing mobile terminal. The mobile terminal is configured with a display screen, and the display screen may be pre-divided into at least one display region. As shown in FIG. 1, the screen display method may include followings.

At block 101, target offset position information of the display screen of the mobile terminal deviating from a preset reference position is acquired.

Specifically, the preset reference position may refer to a position of the display screen in the vertical direction, or in a horizontal position, or in other preset positions, which will not be limited in embodiments of the present disclosure. With the reference position, a rotation angle value of the reference position may be assumed to be 0 (or other fixed value) in order to calculate the offset position information of the display screen deviating from the reference position, i.e., the target offset position information. In an embodiment, the offset position information may include an angle value and/or a rotation direction of the display screen deviating from the reference position, and the like. The angle value may be measured by a preset level sensor, and the rotation direction may be determined by a preset gravity sensor.

At block 102, target display region information corresponding to the target offset position information is searched for from a preset database.

The database may be pre-stored with at least one set of offset position information and display region information corresponding to each set of the offset position information. The display region information indicates one or more information display regions for displaying information needs to be displayed by the terminal. In an embodiment, the database may be preset in the terminal or in a server.

At block 103, content to be displayed by the mobile terminal is displayed in a display region indicated by the target display region information.

In a specific embodiment, after the display region information corresponding to the target offset position information, i.e., the target display region information is determined, the display region indicated by the target display region information (hereinafter referred to as "target display region") may be controlled to display terminal information, such as to display SMS reminders, time, application icons, and the like.

In embodiments of the present disclosure, offset position information of a terminal display screen deviating from a preset reference position is acquired, and target display region information corresponding to the offset position information is searched for in a database, such that it may be controlled to display content to be displayed by the mobile terminal in a display region corresponding to the target display region information. Therefore, the display region is automatically adjusted according to the offset position information of the terminal display screen, the power consumption of the terminal may be reduced and the terminal life time may be improved.

Figure 2:
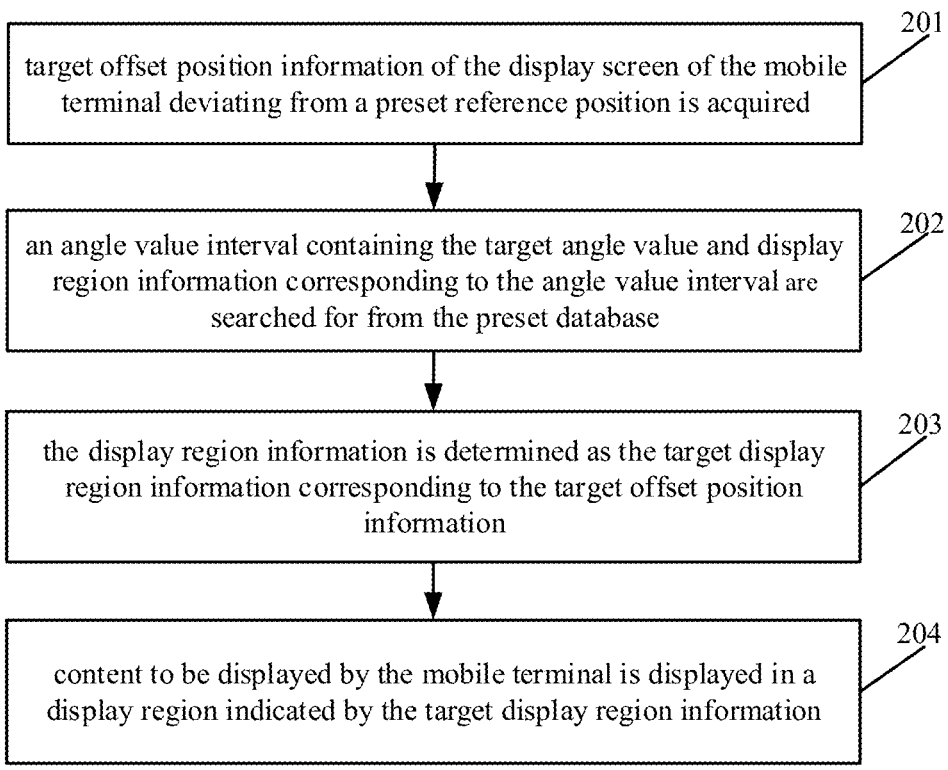
FIG. 2 is a schematic flow chart of a screen display method disclosed in another embodiment of the present disclosure.

Further, referring to FIG. 2. FIG. 2 is a schematic flow chart of a screen display method disclosed in another embodiment of the present disclosure. Specifically, as shown in FIG. 2, the screen display method of the embodiment of the present disclosure may include followings.

At block 201, target offset position information of the display screen of the mobile terminal deviating from a preset reference position is acquired.

Specifically, the mobile terminal in embodiments of the present disclosure may be configured in a ring shape. For example, the mobile terminal may be configured to include a body and an endless belt. In other words, the terminal may be configured as a wristband to facilitate wearing. The display screen may be a flexible display screen disposed on the body of the mobile terminal.

The reference position may be preset, for example, the preset reference position may refer to a position of the display screen (specifically, the center of the flexible display screen) in the vertical direction, or in a horizontal position, or in other preset positions.

At block 202, an angle value interval containing the target angle value and the display region information corresponding to the angle value interval are searched for from the database.

At block 203, the display region information is determined as the target display region information corresponding to the target offset position information.

In an embodiment, the target offset position information may include a target angle value of the display screen deviating from the reference position, such that only at least one angle value interval and display region information corresponding to each angle value interval may be stored in the database. Each angle value interval includes at least one angle value, and each display region information indicates at least one display region for displaying terminal information.

After the angle value of the display screen deviating from the reference position, i.e., the target angle value, is acquired, the terminal may determine the target display region information corresponding to the target angle value, so as to display the terminal information in the target display region, such that different display regions may be invoked according to different angles to display the terminal information. The target angle value ranges from 0 to 360 degrees, and the angle value is determined in a fixed direction (e.g., only in a clockwise direction or only in a counterclockwise direction).

In an embodiment, the target rotation direction of the display screen with respect to the reference position may be acquired. In other words, the target offset position information may include a target rotation direction and a target angle value of the display screen deviating from the reference position. The rotation direction, the angle value interval and the display region information corresponding to the rotation direction and the angle value interval may be stored in the database. Therefore, searching for the target display region information corresponding to the target offset position information from the preset database may specifically include: searching for an angle value interval containing the target angle value and the display region information corresponding to the angle value interval from the database; and determining the display region information as the target display region information corresponding to the target offset position information. In other words, in order to further improve the speed and accuracy of the acquired display region information for displaying the content that the terminal needs to display, in addition to acquiring the angle value (i.e., the target angle value) of the display screen deviating from the offset reference position currently, the rotation direction corresponding to the deviation, such as directions of clockwise rotation or counterclockwise rotation, may also be acquired, such that the target display region information may be quickly determined according to different rotation directions and rotation angle values thereof, thereby realizing an improvement of flexibility of adjusting the display region for displaying the terminal content.

Further, In an embodiment, in some scenarios, determining the display region information as the target display region information corresponding to the target offset position information may include: when the display region information indicating a plurality of display regions, acquiring a distance between each of the plurality of display regions and a human eye, and determining a display region having a minimum distance from the human eye; and determining the determined display region as the display region indicated by the target display region information corresponding to the target offset position information. Specifically, in some special scenarios, such as when the terminal power is low, or when the terminal is in a power saving mode, if there are multiple display regions determined according to the target rotation direction and/or the target angle value, a preferred one may be selected from the regions to display the information. For example, when the display screen is set in an arc shape, the distance between each display region and the human eye (or other feature points) may be different. Therefore, the display region with the shorted distance may be determined as the display region for displaying the terminal content according to the distance between each display region (specifically, the center of the display region) and the human eye, thereby saving power consumption of the terminal. The above distance may be measured by a preset camera or an infrared sensor.

At block 204, content to be displayed by the mobile terminal is displayed in a display region indicated by the target display region information.

In a specific embodiment, after the target offset position information such as the target angle value of display screen deviating from the reference position and display region information (i.e., the target display region information) corresponding to a rotation direction is determined, the display region indicated by the target display region information (hereinafter referred to as the "target display region") may be controlled to display terminal information, such as to display SMS reminders, time, application icons, and the like.

In embodiments of the present disclosure, the angle value and the rotation direction of the terminal display screen deviating from the preset reference position are acquired, and the target display region information corresponding to the angle value and the rotation direction is searched for from the database, thereby realizing the adjustment of the display region, and the display region corresponding to the target display region information is controlled to display the content that the terminal needs to display, such that the display region is automatically adjusted according to the offset position information of the terminal display screen, thereby reducing the power consumption of the terminal and improving the endurance of the terminal. Furthermore, the terminal is set in a ring shape to wear, which effectively improve the flexibility of the terminal display and is convenient to carry.

Figure 3:
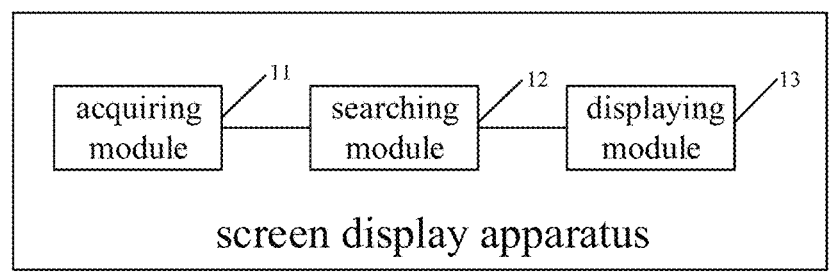
FIG. 3 is a schematic structural diagram of a screen display apparatus disclosed in an embodiment of the present disclosure.

Referring to FIG. 3. FIG. 3 is a schematic structural diagram of a screen display apparatus disclosed in an embodiment of the present disclosure. Specifically, the apparatus described in embodiments of the present disclosure may be specifically configured in the above mobile terminal, in which the mobile terminal is configured with a display screen, and the display screen may be pre-divided into at least one display region. As shown in FIG. 3, the screen display apparatus of embodiments of the present disclosure may include an acquiring module 11, a searching module 12, and a displaying module 13.

The acquiring module 11 is configured to acquire target offset position information of the display screen of the mobile terminal deviating from a preset reference position.

Specifically, the preset reference position may refer to a position of the display screen in the vertical direction, or in a horizontal position, or in other preset positions, which will not be limited in embodiments of the present disclosure.

In an embodiment, the offset position information may include an angle value and/or a rotation direction of the display screen deviating from the reference position, and the like. The angle value may be measured by a preset level sensor, and the rotation direction may be determined by a preset gravity sensor.

The searching module 12 is configured to search for target display region information corresponding to the target offset position information from a preset database.

The database may be pre-stored with at least one set of offset position information and display region information corresponding to each set of the offset position information. The display region information indicates one or more information display regions for displaying information needs to be displayed by the terminal.

The display module 13 is configured to display content to be displayed by the mobile terminal in a display region indicated by the target display region information.

In a specific embodiment, after the search module 12 determines the display region information corresponding to the target offset position information, i.e., the target display region information, the display module 13 may control the display region indicated by the target display region information (hereinafter referred to as "target display region") to display terminal information, such as to display SMS reminders, time, application icons, and the like.

In an alternative embodiment, the target offset position information includes a target angle value of the display screen deviating from the reference position, and the database includes at least one angle value interval and display region information corresponding to each angle value interval.

The searching module 12 may specifically include an information searching unit 121 and an information determining unit 122 (not shown in the drawings).

The information searching unit 121 is configured to search for an angle value interval containing the target angle value and the display region information corresponding to the angle value interval from the database.

The information determining unit 122 is configured to determine the display region information as the target display region information corresponding to the target offset position information.

In an alternative embodiment, the target offset position information includes a target rotation direction and a target angle value of the display screen deviating from the reference position, and the database includes a rotation direction, an angle value interval and the display region information corresponding to the rotation direction and the angle value interval.

The searching module 12 may specifically include an information searching unit 121 and an information determining unit 122.

The information searching unit 121 is configured to search for an angle value interval containing the target angle value and display region information corresponding to the angle value interval and the target rotation direction from the preset database.

The information determining unit 122 is configured to determine the display region information as the target display region information corresponding to the target offset position information.

Further, In an embodiment, the information determining unit 122 may be specifically configured to: when the display region information indicating a plurality of display regions, acquire a distance between each of the plurality of display regions and a human eye, and determine a display region having a minimum distance from the human eye; and determine the determined display region as the display region indicated by the target display region information corresponding to the target offset position information.

In embodiments of the present disclosure, offset position information of a terminal display screen deviating from a preset reference position is acquired, and target display region information corresponding to the offset position information is searched for in a database, such that it may be controlled to display content to be displayed by the mobile terminal in a display region corresponding to the target display region information. Therefore, the display region is automatically adjusted according to the offset position information of the terminal display screen, the power consumption of the terminal may be reduced and the terminal life time may be improved.

Figure 4:
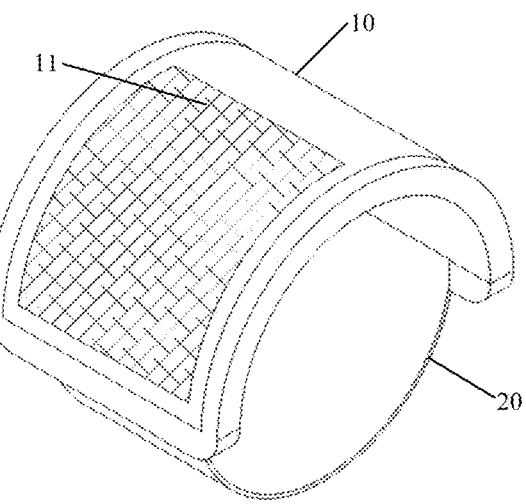
FIG. 4 is a schematic structural diagram of a mobile terminal disclosed in an embodiment of the present disclosure.

Referring to FIG. 4. FIG. 4 is a schematic structural diagram of a mobile terminal disclosed in an embodiment of the present disclosure. As shown in FIG. 4, the mobile terminal of the embodiment of the present disclosure includes a body 10 and an endless belt 20, in which the body 10 is provided with a flexible display screen 11, and the endless belt 20 is configured to connect the two ends of the body 10.

The body 10 is also provided with a level sensor (not shown in the drawings). The level sensor is configured to measure a target angle value of the flexible display screen 11 deviating from a preset reference position to display content to be displayed by the mobile terminal in a display region corresponding to the target angle value.

In an embodiment, the body is also provided with a gravity sensor (not shown in the drawings). The gravity sensor is configured to measure a target rotation direction of the flexible display screen 11 deviating from the reference position to display content to be displayed by the mobile terminal in a display region corresponding to the target rotation direction.

In a specific embodiment, at least one angle value interval and display region information corresponding to each angle value interval are pre-stored in the database, each angle value interval includes at least one angle value, and each display region information indicates at least one display region for displaying terminal information. In an embodiment, the rotation direction of the display screen relative to the reference position may be acquired by the gravity sensor, and the rotation direction, the angle value interval and the display region information corresponding to the rotation direction and the angle value interval are stored in the database. The reference position may be preset, and will not be described in detail herein. It is assumed that the display region at the reference position is the largest, which may be the entire display screen for displaying information, such that an area of the display region indicated by the target display region information decreases firstly and then increases as the target angle value increases.

Further, in an embodiment, the terminal may also be provided with a camera or an infrared sensor for acquiring the distance between each display region and the human being, such that the display region having the shortest distance from the human eye among the multiple display regions is determined as the display region for displaying terminal information in a scenario where the terminal has a low power and the terminal is in a power saving mode, thereby reducing the power consumption of the terminal.

Figure 5A:
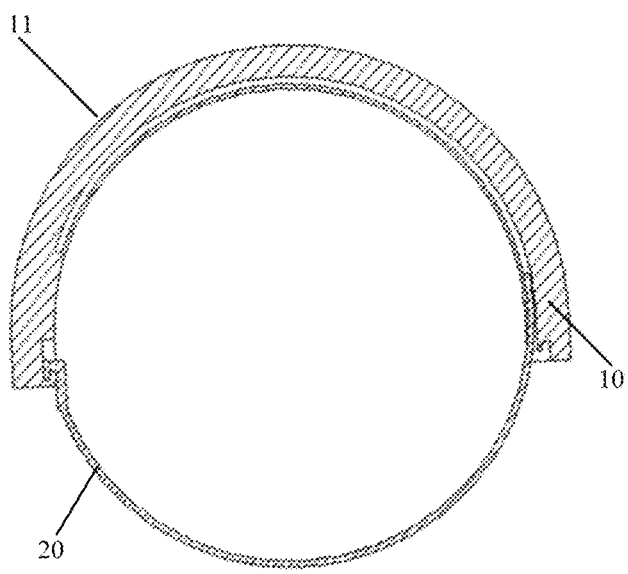
FIG. 5a is a schematic diagram of a reference position according to an embodiment of the present disclosure.
Figure 5B:
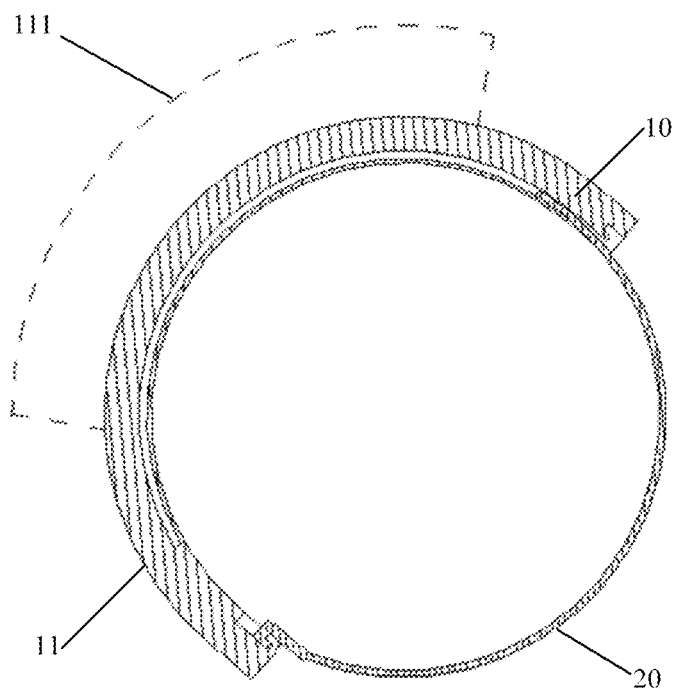
FIG. 5b is a schematic diagram of an offset position disclosed in an embodiment of the present disclosure.
Figure 5C:
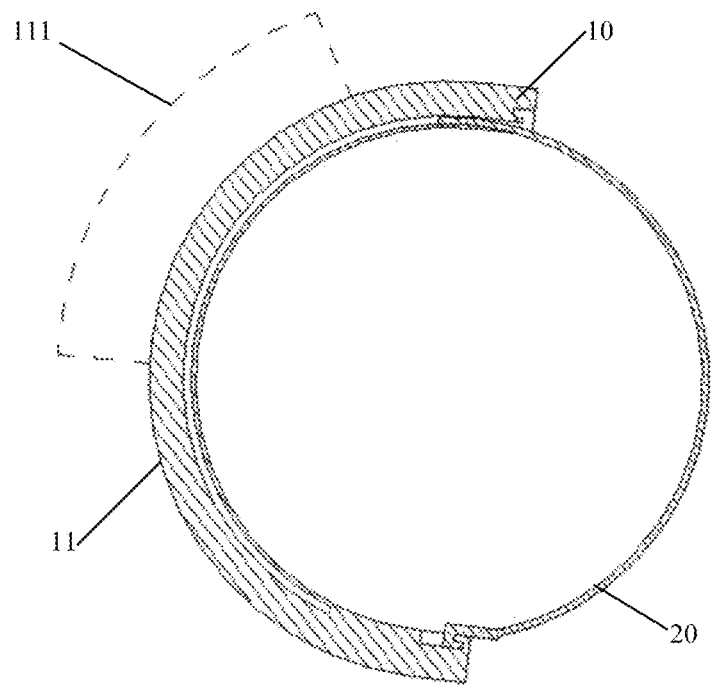
FIG. 5c is a schematic diagram of an offset position disclosed in another embodiment of the present disclosure.

Specifically, as shown in FIG. 5a, the flexible display screen 11 is disposed on the body 10, of which the shape (length, width, etc.) matches with that of the body 10. It is assumed that the preset reference position is the horizontal position of the flexible display screen upward. The angle value of the reference position is 0 degrees, and the flexible display is fully displayed at the reference position. For example, as shown in FIG. 5b, if the level sensor detects that the target angle value of the display screen deviating from the reference position is 40 degrees, and the gravity sensor detects that the rotation direction of the display screen relative to the reference position is counterclockwise, i.e., when it is detected that the terminal rotates 40 degrees counterclockwise, the display region corresponding to the counterclockwise rotation of 40 degrees (i.e., the target display region 111 in FIG. 5b) may be invoked to display the terminal information, and the remaining regions of the display screen are controlled to not display, such as entering an off-screen state. Further, as shown in FIG. 5c, if the level sensor detects that the target angle value of the display screen deviating from the reference position is 70 degrees, and the gravity sensor detects the rotation direction of the display screen relative to the reference position is counterclockwise rotation, i.e., when it is detected that the terminal rotates 70 degrees counterclockwise, the display region corresponding to the counterclockwise rotation of 70 degrees (i.e., the target display region 111 in FIG. 5c) may be invoked to display the terminal information, and the remaining regions of the display screen are controlled to not display, such as entering an off-screen state. The display region corresponding to 70 degrees counterclockwise is smaller than the display region corresponding to the counterclockwise 40 degrees.

Specifically, the mobile terminal in embodiments of the present disclosure may refer to the related description of the corresponding embodiments in FIGS. 1-2, which will not be described in detail herein.

Figure 6:
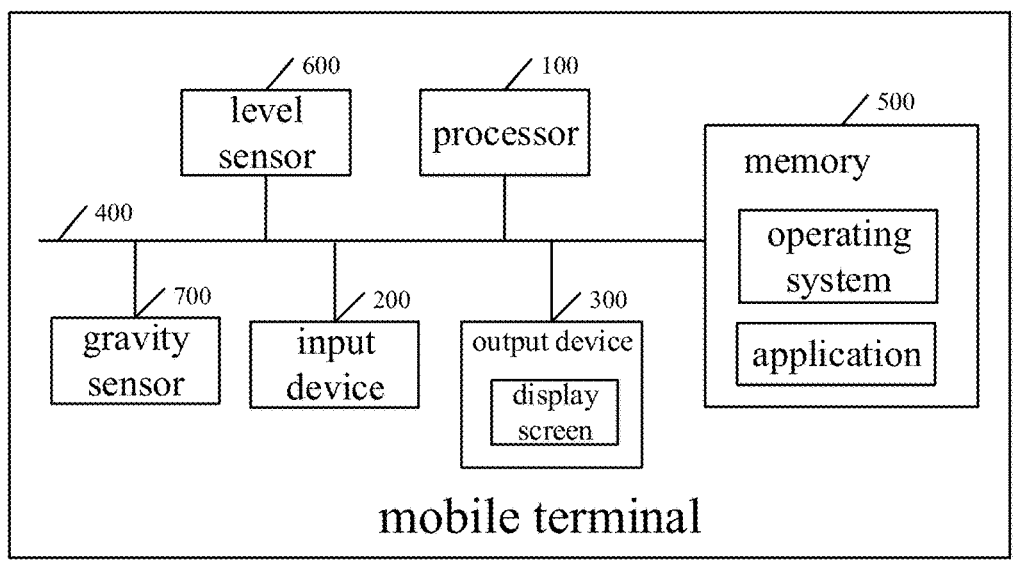
FIG. 6 is a schematic structural diagram of a mobile terminal disclosed in another embodiment of the present disclosure.

Referring to FIG. 6, FIG. 6 is a schematic structural diagram of a mobile terminal disclosed in an embodiment of the present disclosure, in which the mobile terminal is configured to perform the above screen display method. Specifically, as shown in FIG. 6, the mobile terminal (referred to as the "terminal") in embodiments of the present disclosure may include: at least one processor 100, at least one input device 200, at least one output device 300, a memory 500, and a level sensor 600, a gravity sensor 700 and other components. These components are communicatively connected via one or more buses 400. It will be understood by those skilled in the art that the structure of the terminal shown in FIG. 6 does not constitute a limitation on the embodiment of the present disclosure. It may be a bus-shaped structure or a star-shaped structure, and may also include more or less components than the figure, or combine some components or in different component configurations.

The processor 100 is a control center of the terminal, and connects various parts of the entire terminal via various interfaces and wires, by performing or executing programs and/or modules stored in the memory 500, and calling data stored in the memory 500, various functions of the terminal may be performed and data may be processed. The processor 100 may be composed of an integrated circuit (IC for short), for example, may be composed of a single packaged IC, or may be composed of a plurality of packaged ICs that have the same function or different functions. For example, the processor 100 may only include a central processing unit (CPU for short), or may be a combination of a CPU, a digital signal processor (DSP for short), a graphics processing unit (GPU for short) and various control chips. In embodiments of the present disclosure, the CPU may be a single operation core, and may also include a multiple operation core.

The input device 200 may include a standard touch screen, a keyboard, a camera, etc., and may also include a wired interface, a wireless interface and the like.

The output device 300 may include a display screen, a speaker, etc., and may also include a wired interface, a wireless interface and the like. The display screen may be a flexible display screen in particular.

The memory 500 may be configured to store software programs and modules, and the processor 100, the input device 200, and the output device 300 perform various functional applications of the terminal and implement data processing by calling software programs and modules stored in the memory 500. The memory 500 mainly includes a program storage region and a data storage region, in which the program storage region may store an operating system, applications required for at least one function and the like; the data storage region may store data created according to the use of the terminal and the like. In embodiments of the present disclosure, the operating system may be an Android system, an iOS system, a Windows operating system and the like.

Specifically, the mobile terminal is configured with a display screen, and the display screen is provided with at least one display region. The processor 100 invokes an application stored in the memory 500 for performing the following steps: acquiring target offset position information of the display screen of the mobile terminal deviating from a preset reference position; searching for target display region information corresponding to the target offset position information from a preset database, the database including at least one set of offset position information and display region information corresponding to each set of the offset position information; displaying content to be displayed by the mobile terminal in a display region indicated by the target display region information.

In an alternative embodiment, the target offset position information includes a target angle value of the display screen deviating from the reference position, the database includes at least one angle value interval and display region information corresponding to each angle value interval; and the processor 100 invokes applications stored in the memory 500 to search for target display region information corresponding to the target offset position information from a preset database by performing acts of: searching for an angle value interval containing the target angle value and the display region information corresponding to the angle value interval from the database; and determining the display region information as the target display region information corresponding to the target offset position information.

In an alternative embodiment, the target offset position information includes a target rotation direction and a target angle value of the display screen deviating from the reference position, the database includes at least one rotation direction, an angle value interval and display region information corresponding to each rotation direction and the angle value interval; and the processor 100 invokes an application stored in the memory 500 to search for the target display region information corresponding to the target offset position information from the preset database by performing acts of: searching for an angle value interval containing the target angle value and display region information corresponding to the angle value interval and the target rotation direction from the preset database; and determining the display region information as the target display region information corresponding to the target offset position information.

In an alternative embodiment, the processor 100 invokes an application stored in the memory 500 to determine the display region information as the target display region information corresponding to the target offset position information by performing acts of: when the display region information indicating a plurality of display regions, acquiring a distance between each of the plurality of display regions and human eye, and determining a display region having a minimum distance from the human eye; and determining the determined display region as the display region indicated by the target display region information corresponding to the target offset position information.

In an embodiment, the distance may be measured by a device such as a preset camera or an infrared sensor. The target angle value may be measured by a preset level sensor. The target rotation direction may be measured by a preset gravity sensor.

In the above embodiments, the descriptions of the various embodiments have various focusing points, and the parts that are not described in detail in a certain embodiment may be referred to the related descriptions of other embodiments.

In some embodiments provided by the present disclosure, it should be understood that the disclosed apparatus and method can be implemented in other manners. For example, the apparatus embodiments described above are merely illustrative. For example, the division of the modules is merely a logical function division. In actual implementations, there may be another division manner, for example, multiple modules or components may be combined or may be integrated into another system, or some features may be ignored or not executed. In addition, the mutual coupling or direct coupling or communication connection shown or discussed may be an indirect coupling or communication connection via some interfaces, devices or modules, and may be in an electrical, mechanical or other forms.

The modules described as separate components may or may not be physically separated. The components displayed as modules may or may not be physical modules, that is, may be located in one place, or may be distributed to multiple network modules. Some or all of the modules may be selected according to actual needs to achieve the purpose of the solution of the embodiments.

In addition, each functional module in each embodiment of the present disclosure may be integrated into one processing module, or each module may exist physically separately, or two or more modules may be integrated into one module. The above integrated modules may be implemented in the form of hardware or in the form of a combination of hardware and software function modules.

The above-described integrated modules implemented in the form of software function modules may be stored in a computer readable storage medium. The software function modules described above are stored in a storage medium and include instructions for causing a computer device (which may be a personal computer, a server, or a network device, etc.) or a processor to perform a part of steps of the methods in embodiments of the present disclosure. The foregoing storage medium includes medium which may store program codes, including a USB disk, a mobile hard disk, a read-only memory (ROM), a random access memory (RAM), a magnetic disk, or an optical disk, and the like.

A person skilled in the art may clearly understand that the division of each functional module described above is merely exemplary for the convenience and brevity of the description. In practical applications, the above function assignments may be completed by different functional modules as needed, that is, the internal structure of the apparatus may be provided with different functional modules to perform all or part of the functions described above, so as to complete the specific working process of the apparatus described above. The detail working process of the above apparatus may refer to the corresponding process in the above method embodiments, which will not be described in detail herein.

Finally, it should be noted that the above embodiments are merely illustrative for describing the technical solutions of the present disclosure, and are not intended to be a limitation thereof. Although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not deviate from the scope of the technical solutions of embodiments of the present disclosure.

What is claimed is:

1. A screen display method, applied to a mobile terminal, the mobile terminal being configured with a display screen, the display screen being provided with at least one display region, and the method comprising:
    acquiring target offset position information of the display screen of the mobile terminal deviating from a preset reference position, the target offset position information comprising an angle value and a rotation direction, wherein the angle value is measured by a level sensor arranged in the mobile terminal, and the rotation direction is determined by a gravity sensor arranged in the mobile terminal;
    searching for target display region information corresponding to the target offset position information from a preset database, the display region information indicating a plurality of display regions configured to display information which is required to be displayed, and the preset database comprising at least one set of offset position information and display region information corresponding to each set of the offset position information; and
    when it is detected that an electric quantity of the mobile terminal is lower than a preset electric quantity threshold or the mobile terminal is in a power saving mode, selecting a display region from the plurality of display regions configured to display the information which is required to be displayed, and displaying content to be displayed by the mobile terminal in the display region, the target offset position information comprising a target angle value of the display screen deviating from the preset reference position, the preset database comprising at least one angle value interval and display region information corresponding to each angle value interval; and
    searching for the target display region information corresponding to the target offset position information from the preset database comprising:
        searching for an angle value interval containing the target angle value and display region information corresponding to the angle value interval from the preset database; and
        determining the display region information as the target display region information corresponding to the target offset position information;
        wherein an area of the display region indicated by the target display region information decreases firstly and then increases as the target angle value increases.

2. The method according to claim 1, wherein the target offset position information further comprises a target rotation direction, the preset database further comprises a rotation direction, and the display region information further corresponds to the rotation direction; and
    wherein searching for the angle value interval containing the target angle value and display region information corresponds to the angle value interval and the target rotation direction from the preset database.

3. The method according to claim 2, wherein the target rotation direction is measured by a preset gravity sensor.

4. The method according to claim 1, wherein determining the display region information as the target display region information corresponding to the target offset position information comprises:
    when the display region information indicating a plurality of display regions, acquiring a distance between each of the plurality of display regions and a human eye, and determining a display region having a minimum distance from the human eye; and
    determining the determined display region as the display region indicated by the target display region information corresponding to the target offset position information.

5. The method according to claim 1, wherein the target angle value is measured by a preset level sensor.

6. The method according to claim 1, wherein when the display screen is at the reference position, the display region has a maximum area.

7. The method according to claim 1, wherein each angle value interval comprises at least one angle value, the display region information indicates at least one display region for displaying the content to be displayed by the mobile terminal, and the target angle value ranges from 0 to 360 degrees and determined based on at least one direction of a clockwise direction and a counterclockwise direction.

8. A screen display apparatus, provided in a mobile terminal, the mobile terminal being configured with a display screen, the display screen being provided with at least one display region, and the apparatus comprising one or more processors; a memory storing instructions executable by the one or more processors; the one or more processors being configured to:
acquire target offset position information of the display screen of the mobile terminal deviating from a preset reference position, the target offset position information comprising an angle value and a rotation direction, wherein the angle value is measured by a level sensor arranged in the mobile terminal, and the rotation direction is determined by a gravity sensor arranged in the mobile terminal;
search for target display region information corresponding to the target offset position information from a preset database, the display region information indicating a plurality of display regions configured to display information which is required to be displayed, and the preset database comprising at least one set of offset position information and display region information corresponding to each set of the offset position information; and
when it is detected that an electric quantity of the mobile terminal is lower than a preset electric quantity threshold or the mobile terminal is in a power saving mode, select a display region from the plurality of display regions configured to display the information which is required to be displayed, and display content to be displayed by the mobile terminal in the display region;
the target offset position information comprising a target angle value of the display screen deviating from the preset reference position, the preset database comprising at least one angle value interval and display region information corresponding to each angle value interval; and
the one or more processors searching for the target display region information corresponding to the target offset position information from the preset database by performing acts of:
searching for an angle value interval containing the target angle value and display region information corresponding to the angle value interval from the preset database; and
determining the display region information as the target display region information corresponding to the target offset position information,
wherein an area of the display region indicated by the target display region information decreases firstly and then increases as the target angle value increases.

9. The apparatus according to claim 8, wherein the target offset position information further comprises a target rotation direction, the preset database further comprises a rotation direction, and the display region information further corresponds to the rotation direction; and
wherein searching for the angle value interval containing the target angle value and display region information corresponds to the angle value interval and the target rotation direction from the preset database.

10. The apparatus according to claim 9, wherein the target rotation direction is measured by a preset gravity sensor.

11. The apparatus according to claim 8, the one or more processors determining the display region information as the target display region information corresponding to the target offset position information by performing acts of:
when the display region information indicating a plurality of display regions, acquiring a distance between each of the plurality of display regions and a human eye, and determining a display region having a minimum distance from the human eye; and
determining the determined display region as the display region indicated by the target display region information corresponding to the target offset position information.

12. The apparatus according to claim 8, wherein the target angle value is measured by a preset level sensor.

13. The apparatus according to claim 8, wherein when the display screen is at the reference position, the display region has a maximum area.

* * * * *